US010681525B2

(12) United States Patent
Pinheiro et al.

(10) Patent No.: US 10,681,525 B2
(45) Date of Patent: Jun. 9, 2020

(54) ACCESS CONTROL MECHANISMS FOR D2D DISCOVERY AND COMMUNICATION (71) Applicant: INTEL IP CORPORATION, Santa Clara, CA (US)

(72) Inventors: Ana Lucia Pinheiro, Breinigsville, PA (US); Marta Martinez Tarradell, Hillsboro, OR (US); Richard Burbidge, Shrivenham (GB); Youn Hyoung Heo, Seoul (KR); Sangeetha Bangolae, Houston, TX (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/507,199

(22) PCT Filed: Jun. 30, 2015

(86) PCT No.: PCT/US2015/038677
§ 371 (c)(1),
(2) Date: Feb. 27, 2017

(87) PCT Pub. No.: WO2016/048431
PCT Pub. Date: Mar. 31, 2016

(65) Prior Publication Data
US 2017/0251353 A1 Aug. 31, 2017

Related U.S. Application Data (60) Provisional application No. 62/055,598, filed on Sep. 25, 2014.

(51) Int. Cl.
*H04W 48/02* (2009.01)
*H04W 72/04* (2009.01)
(Continued)

(52) U.S. Cl.
CPC ............ *H04W 8/005* (2013.01); *H04W 48/02* (2013.01); *H04W 76/14* (2018.02); *H04W 76/27* (2018.02); *H04W 88/02* (2013.01); *H04W 88/08* (2013.01)

(58) Field of Classification Search
CPC ... H04W 8/005; H04W 48/02; H04W 76/023; H04W 76/046; H04W 76/14;
(Continued)

(56) References Cited

U.S. PATENT DOCUMENTS 9,867,119 B2 * 1/2018 Lee ...................... H04W 48/08
10,178,602 B2 * 1/2019 Lee ......................... H04W 4/14
(Continued)

FOREIGN PATENT DOCUMENTS

| CN | 104025475 A | 9/2014 |
|---|---|---|
| JP | 2012004683 A | 1/2012 |
| JP | 2013236169 A | 11/2013 |

OTHER PUBLICATIONS

3GPP TSG-RAN WG2 Meeting #85bis; R2-141300; D2D Resource Allocation Mode Selection; Agenda item: 7.4-2; Valencia, Spain; Mar. 31 to Apr. 4, 2014 (Year: 2014).*
(Continued)

*Primary Examiner* — Edan Orgad
*Assistant Examiner* — Vanneilian Lalchinthang
(74) *Attorney, Agent, or Firm* — Thorpe North & Western (57) ABSTRACT Technology to support access-class-barring (ACB) skipping for commercial and public-safety user equipments (UEs) is disclosed. A cellular mobile network experiencing congestion at the core network level can be configured to send a communication to UEs indicating that ACB may be skipped by UEs seeking to establish device-to-device (D2D) communication using a first mode of D2D resource allocation wherein D2D resources are allocated by the network. In
(Continued)

```
SystemInformationBlockType2 information element

-- ASN1START

SystemInformationBlockType2 ::=     SEQUENCE {
<portions of the ASN.1 text are omitted>
    [[
        ac-BarringSkipForMMTELVoice-r12    ENUMERATED {true}
OPTIONAL,   -- Need OP
        ac-BarringSkipForMMTELVideo-r12    ENUMERATED {true}
OPTIONAL,   -- Need OP
        ac-BarringSkipForSMS-r12           ENUMERATED {true}
OPTIONAL    -- Need OP
        ac-BarringSkipForD2D-rxx           ENUMERATED {true}
OPTIONAL    -- Need OP
    ]]

< portions of the ASN.1 text are omitted>                       110

-- ASN1STOP
``` addition, the network can be configured to send a communication indicating that a second mode of D2D resource allocation wherein D2D resources are allocated by the UEs may be used as an alternative to the first mode. The network may also indicate that the second mode can be used as a fallback when current ACB parameters indicate that use of the first mode is not currently permitted.

15 Claims, 7 Drawing Sheets

(51) Int. Cl.
*H04W 8/00* (2009.01)
*H04W 76/14* (2018.01)
*H04W 76/27* (2018.01)
*H04W 88/02* (2009.01)
*H04W 88/08* (2009.01)

(58) Field of Classification Search
CPC ..... H04W 76/27; H04W 88/02; H04W 88/08; H04W 4/14; H04W 48/12
USPC ......................................................... 370/329
See application file for complete search history.

(56) References Cited

U.S. PATENT DOCUMENTS

| | | | |
|---|---|---|---|
| 2014/0056220 A1 | 2/2014 | Poitau et al. | |
| 2015/0327312 A1* | 11/2015 | Burbidge | H04W 72/14 370/329 |
| 2015/0334769 A1* | 11/2015 | Kim | H04W 36/36 370/329 |
| 2016/0044727 A1* | 2/2016 | Zisimopoulos | H04W 48/02 455/41.2 |
| 2017/0142560 A1* | 5/2017 | Ryu | H04W 4/08 |
| 2017/0230958 A1* | 8/2017 | Lee | H04W 76/14 |
| 2018/0213521 A1* | 7/2018 | Martin | H04W 72/048 |

OTHER PUBLICATIONS

3GPP TSG-RAN WG2 #87; R2-143461; Discussion on Access Control for Prose D2D Service; Agenda item: 7-4.3; Dresden, Germany; Aug. 18-22, 2014 (Year: 2014).*
ITRI 3GPP TSG-RAN WG2 #87 "Discussion on Access Control for ProSe D2D Service" (Year: 2014).*
3GPP TSG-RAN WG2 Meeting #85bis; R2-141300; D2D Resource Allocation Mode Selection; Agenda item: 7.4.2; Valencia, Spain; Mar. 31 to Apr. 4, 2014.
3GPP TSG-RAN WG2 #87; R2-143461; Discussion on Access Control for ProSe D2D Service; Agenda item: 7.4.3; Dresden, Germany; Aug. 18-22, 2014.

* cited by examiner

```
SystemInformationBlockType2 information element

-- ASN1START

SystemInformationBlockType2 ::=    SEQUENCE {
<portions of the ASN.1 text are omitted>
   [[
      ac-BarringSkipForMMTELVoice-r12    ENUMERATED {true}
OPTIONAL,    -- Need OP
         ac-BarringSkipForMMTELVideo-r12    ENUMERATED {true}
OPTIONAL,    -- Need OP
         ac-BarringSkipForSMS-r12           ENUMERATED {true}
OPTIONAL    -- Need OP
         ac-BarringSkipForD2D-rxx           ENUMERATED {true}
OPTIONAL    -- Need OP
   ]]

< portions of the ASN.1 text are omitted>

-- ASN1STOP
```

```
SystemInformationBlockType2 information element
-- ASN1START

SystemInformationBlockType2 ::=        SEQUENCE {
    ac-BarringInfo                     SEQUENCE {
<portions of the ASN.1 text are ommited>
                                                                    210
        ac-BarringSkipForSMS-r12                ENUMERATED {true}
OPTIONAL    -- Need OP
        ac-BarringSkipForD2D-PublicSafety-rxx
ENUMERATED {true}           OPTIONAL    -- Need, OP
        ac-BarringSkipForD2D-NonPublicSafety-rxx
ENUMERATED {true}           OPTIONAL    -- Need OP ]]
< portions of the ASN.1 text are omitted>
                                                                    220
```

FIG. 2

5.3.3.2      Initiation

The UE initiates the procedure when upper layers request establishment of an RRC connection while the UE is in RRC_IDLE.

Upon initiation of the procedure, the UE shall:

> 1> if upper layers indicate that the RRC connection is subject to EAB (see TS 24.301 [35]):
>
>> 2> if the result of the EAB check, as specified in 5.3.3.12, is that access to the cell is barred:
>>
>>> 3> inform upper layers about the failure to establish the RRC connection and that EAB is applicable, upon which the procedure ends;
>
> 1> if the UE is establishing the RRC connection for D2D communication purposes and SystemInformationBlockType2 includes ac-BarringSkipForD2D;
>
>> 2> consider access to the cell as not barred;  320
>
> 1> else if the UE is establishing the RRC connection for mobile terminating calls:
>
>> 2> if timer T302 is running:
>>
>>> 3> inform upper layers about the failure to establish the RRC connection and that access barring for mobile terminating calls is applicable, upon which the procedure ends;

<remaining text omitted>

5.3.3.2 Initiation

The UE initiates the procedure when upper layers request establishment of an RRC connection while the UE is in RRC_IDLE.

Upon initiation of the procedure, the UE shall:

> 1> if upper layers indicate that the RRC connection is subject to EAB (see TS 24.301 [35]):
>
>> 2> if the result of the EAB check, as specified in 5.3.3.12, is that access to the cell is barred:
>>
>>> 3> inform upper layers about the failure to establish the RRC connection and that EAB is applicable, upon which the procedure ends;

<text omitted>

> 1> else if the UE is establishing the RRC connection for mobile originating MMTEL voice, mobile originating MMTEL video, mobile originating SMSoIP, ~~or~~ mobile originating SMS <u>or mobile originated D2D:</u> ~410
>
>> 2> if the UE is establishing the RRC connection for mobile originating MMTEL voice and SystemInformationBlockType2 includes ac-BarringSkipForMMTELVoice, or
>>
>> 2> if the UE is establishing the RRC connection for mobile originating MMTEL video and SystemInformationBlockType2 includes ac-BarringSkipForMMTELVideo, or
>>
>> 2> if the UE is establishing the RRC connection for mobile originating SMSoIP or mobile originating SMS, and SystemInformationBlockType2 includes ac-BarringSkipForSMS, <u>or</u>
>>
>> <u>2> if the UE is establishing the RRC connection for mobile originating D2D and SystemInformationBlockType2 includes ac-BarringSkipForD2D;</u> — 420
>>
>>> 3> consider access to the cell as not barred; — 430

<text omitted>

FIG. 4a

Table D.1.1: Mapping of NAS procedure to establishment cause and call type

| NAS procedure | RRC establishment cause (according 3GPP TS 36.331 [22]) | Call type |
|---|---|---|
| Tracking Area Update | If the UE does not have a PDN connection established for emergency bearer services and is not initiating a PDN CONNECTIVITY REQUEST that has request type set to "emergency", and MO MMTEL voice call is not started, MO MMTEL video call is not started, MO SMSoIP is not started, MO SMS over NAS or MO SMS over S102 is not requested, and D2D communication is not requested, the RRC establishment cause shall be set to MO signalling. (See Note 1) | "originating signalling" |
| | If the UE does not have a PDN connection established for emergency bearer services and is not initiating a PDN CONNECTIVITY REQUEST that has request type set to "emergency", and the UE wants to establish D2D communication, the RRC establishment cause shall be set to MO signalling. (See Note 1) — 440 | "originating D2D" |
| | <other rows omitted> | |

ACCESS CONTROL MECHANISMS FOR D2D DISCOVERY AND COMMUNICATION

BACKGROUND

Wireless mobile communication technology uses various standards and protocols to transmit data between a network node (e.g., a transmission station) and a wireless device (e.g., a mobile device). Some wireless devices communicate using orthogonal frequency-division multiple access (OFDMA) in a downlink (DL) transmission and single-carrier frequency-division multiple access (SC-FDMA) in an uplink (UL) transmission. Standards and protocols that use orthogonal frequency-division multiplexing (OFDM) for signal transmission include the third-generation partnership project (3GPP) long-term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the network node can be an Evolved Universal Terrestrial Radio Access Network (E-UTRAN) Node B (also commonly denoted as evolved Node Bs, enhanced Node Bs, eNodeBs, or eNBs). The network node can communicate with the wireless device; a user equipment (UE) is one example of such a wireless device. The downlink (DL) transmission can be a communication from the network node (e.g., eNodeB) to the wireless device (e.g., UE), and the uplink (UL) transmission can be a communication from the wireless device to the network node. The geographical area wherein wireless devices are served by the network node can be referred to as a cell.

In LTE systems, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

A D2D communication is a direct communication between two devices, such as two user equipments (UEs). The two devices (e.g., LTE-based devices) can communicate directly with one another when the two devices are in relatively close proximity. D2D communications may be assisted by a cellular system such as LTE or may not use the cellular network infrastructure at all.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates an of ASN.1 code that can be used to define two information elements in a SIB2 in accordance with an example;

FIG. 3 illustrates an example of a definition that may be added to a portion of the 3GPP Technical Specification to support ACB skip functionality for D2D communication in accordance with an example;

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

A technology is described for performing device-to-device (D2D) communications at a user equipment (UE). The UE can operate according to LTE/E-UTRAN related standards. For example, the UE can operate in a cellular mobile network according to the 3GPP LTE Release 12 (or earlier) standard for E-UTRAN. D2D communication features can be referred to as ProSe (Proximity Services) Direct Commination in the 3GPP LTE standard. D2D communication can occur when a UE is outside of the coverage of the cellular network, or alternatively, when the UE in within coverage of the cellular network. The D2D data can be carried by a D2D radio bearer.

In one example, a UE that is sending D2D data can be referred to as the sending UE and a UE that is receiving the D2D data can be referred to as a destination UE, a target UE, or a receiving UE. The D2D data can be generated by an application that is running on the sending UE. In one embodiment, the application can be referred to as a D2D application, although it is not limited to specific D2D type applications. The sending UE can identify that the D2D data is to be transmitted to the target UE using a D2D radio bearer established between the sending UE and the target UE. In one example, the D2D data can be sent from the sending UE to a single target UE or a group of target UEs. (Examples described herein can refer to transmission to a target or receiving UE, but it should be understood that this could also be a transmission to a group of target or receiving UEs.)

D2D communication can allow a direct link between two UEs that are using the cellular spectrum. As a result, media or other data can be transferred from one device to another device over short distances using a direct connection. When data is communicated via a D2D connection, the data does not have to be relayed to the cellular network. Hence, even if the cellular network is overloaded or provides poor coverage, the data can still be communicated via a D2D connection. The cellular infrastructure, if present, can assist with other issues, such as peer discovery, synchronization, and the provision of identity and security information.

The use of D2D communication can provide several benefits to users. For example, the devices can be remote from cellular infrastructure. D2D communication can allow devices to communicate locally, even when the cellular network has failed (e.g., during a disaster) because D2D communication does not rely on the network infrastructure. For this reason, devices with D2D capability can be well-suited for public-safety applications (though they can also be used for other applications).

The D2D communication feature enables data to be directly exchanged between UEs over the cellular radio spectrum without requiring the data to be carried by the cellular network infrastructure. Hence, another benefit D2D communication provides is that licensed spectrum can be used; frequencies in the licensed spectrum are generally less subject to interference. Furthermore, if two devices using D2D communication are in close proximity, reduced transmission power levels can be used; this leads to more efficient energy consumption at the devices.

In order for a sending UE to send D2D data to a target UE, the sending UE can transition into an RRC connected mode with an eNB, such as a macro eNB or a low power eNB. The sending UE can receive information from the network, via the eNB, that a defined resource allocation mode is to be used for communicating the D2D data to the target UE. For instance, the sending UE can determine a defined resource allocation mode based on a system information block (SIB) broadcast from the eNB.

In D2D resource allocation mode 1, an eNB serving a cell in which a UE is situated, can be actively involved in scheduling the air interface resources that are used by the UE to perform the D2D transmissions. In an alternative scenario, the UE can perform the D2D transmissions using D2D resource allocation mode 2, a mode in which the UE is more autonomous in performing the D2D transmissions. D2D resource allocation mode 2 may occur when the UE is outside coverage of the eNB, but can also occur when the UE is within coverage. In mode 2, the eNB can reserve a certain portion of its resources and then allow the UE to autonomously choose how to transmit D2D data within that reserved portion. Since the resources are reserved for the D2D communications in a rather static manner, a waste of resources can occur when all of the reserved resources are not be used. In contrast, D2D resource allocation mode 1 allows the network to dynamically allocate resources when D2D transmissions are imminent, thereby providing a more efficient solution. If there are no UEs that desire to perform D2D transmissions, then resources are not unnecessarily assigned for D2D transmissions and are available for normal cellular communications.

In one example, the defined resource allocation mode can be D2D resource allocation mode 1. A service request procedure can be initiated at a non-access stratum (NAS) of the UE. The service request procedure can trigger an RRC layer of the UE to perform an RRC connection establishment procedure with the eNB. The UE can switch from an RRC idle mode to an RRC connected mode upon completion of the RRC connection establishment procedure. The UE, now in the RRC connected mode, can send a buffer status report (BSR) to the eNB, and in response, the UE can receive an uplink (UL) grant from the eNB for transmission of the D2D data to the target UE. The UE can send the D2D data to the target UE using the UL grant provided by the eNB. The D2D data can be transmitted from the sending UE to the target UE using the D2D radio bearer setup between the sending UE and the target UE.

While D2D radio bearers are similar to the radio bearers used for cellular communication, there are several key differences. For example, a D2D radio bearer can exist between D2D UEs when the UE is in either a radio resource control (RRC) idle mode or an RRC connected mode. In other words, the D2D radio bearer can exist when the UE is in either RRC_IDLE mode or RRC_CONNECTED mode. In contrast, cellular radio bearers (or data radio bearers) typically exist when the UE is in the RRC connected mode. In addition, D2D radio bearers can be created and released by the UE as necessary based on the arrival of data from application layers of the UE. In contrast, cellular radio bearers are created, configured and released by the network. Moreover, D2D data does not travel through the 3GPP network, as it is transmitted directly between two UEs.

When the UE uses D2D resource allocation mode 1, the UE can use the cell radio resources but may not be using any core network resources. Therefore, if there is congestion or a problem in the core network data path, D2D communication can still be allowed to proceed. However, current access-class barring mechanisms that may be applied in a congested network can unnecessarily prohibit the UEs from establishing an RRC connection even if the UE only seeks to establish the RRC connection for the purpose of D2D communication.

An Access-class barring (ACB) mechanism can be used to control access to the network by prohibiting certain UEs from starting an RRC connection establishment procedure when core network resources are congested. An eNB can apply the ACB mechanism by transmitting certain parameters in broadcast system information. A UE that receives the broadcast system information determines whether or not the UE is allowed to access the cell based on these parameters. The parameters may include, for example: an access class (ac)-BarringFactor, a probability factor used to control the proportion of UEs in the cell's coverage area that are barred from using the cell; ac-BarringTime, a time period during which a UE considers access to the cell to be barred; and ac-BarringForSpecialAC, a bit map wherein each bit determines whether UEs that belong to a special category (e.g., operator employees, emergency services, etc.) are permitted to access the cell.

Some UEs can be configured by a Home Public Land Mobile Network (HPLMN) to be public-safety UEs. In some cases, a public-safety UE has a Universal Subscriber Identity Module (USIM) with a special access class (e.g., I1, I2, or I3). In other cases, however, a public-safety UE does not contain a USIM that has been assigned a special access class.

Public-safety UEs that do not contain USIMs with special access classes and commercial (e.g., not public-safety) UEs are configured to apply access class barring (ACB) based on parameters found in broadcast system information received from the cell. In existing schemes, the ACB is applied even if these types of UEs are only seeking to access the network in order to facilitate D2D communication using resource allocation mode 1. Thus, in situations where there is core network congestion (but not necessarily radio access congestion at a specific eNB), a UE may be unable to enter RRC_CONNECTED mode and thus be unable to perform D2D communication even though D2D communication would not actually consume core network resources.

ACB skip, which was introduced in 3GPP release 11, allows UEs that are seeking to establish an RRC connection for Multimedia Telephony (MMTel) IP Multimedia System (IMS) voice/video or Short Message Service over IP (SM-SoIP) over Signaling Gateways (SGs) to skip the ACB procedure. In this way, these services (e.g., MMTel IMS voice/video and SMSoIP SMS over SGs) are given priority when congestion occurs. ACB skip can be activated individually for each type of service.

Some examples described herein illustrate systems and methods that may be used to extend the principle of ACB skipping to UEs that are seeking to connect to a network for D2D allocation purposes. Further examples described herein also illustrate systems and methods whereby a network can indicate that UEs are permitted to perform D2D communication using D2D-allocation mode 2 (or not) when use of D2D-allocation mode 1 is barred.

Figure 1:
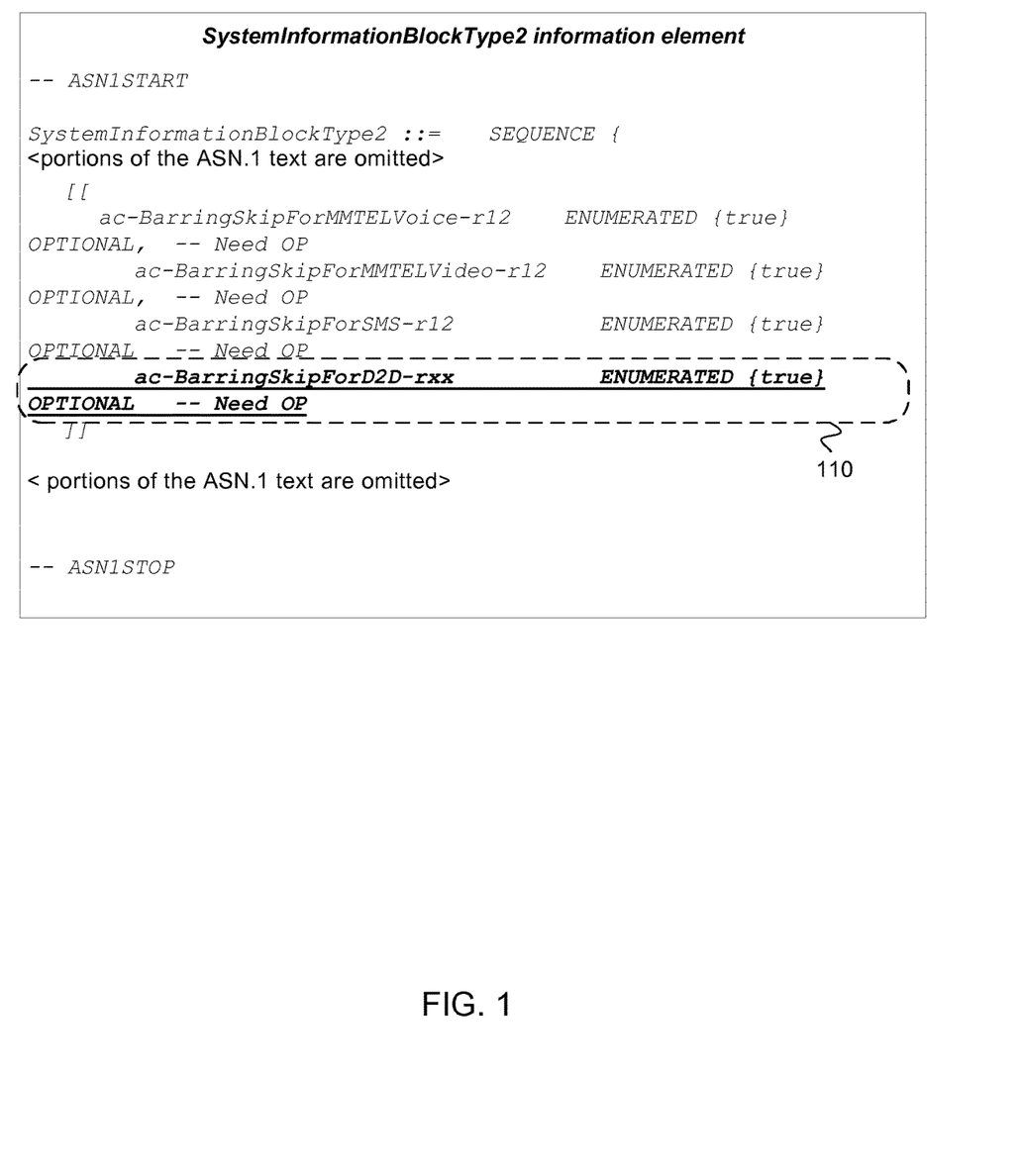
FIG. 1 illustrates an example of Abstract Syntax Notation One (ASN.1) code that can be used to define an information element (IE) in a system information block type 2 (SIB2) in accordance with an example.

As mentioned before, a 3GPP LTE network can restrict RRC connection setup request attempts by using access class barring (ACB). As a part of D2D, it can be beneficial to extend this mechanism, such that the eNB can configure different barring parameters for UEs that are sending an RRC connection request for purposes of D2D resource allocation. ACB parameters specific to D2D can be added to the System Information Block 2 (SIB2), as shown in FIG. 1. For example, as shown in selection 110, a parameter called ac-BarringForD2D-r12 can be added to the SIB2 for setting up the ACB configuration.

With access class barring, the network may wish to set different barring configurations depending on whether the UE is accessing the network for the purpose of D2D communication, or the whether the UE is accessing the network for normal cellular communication traffic purposes (e.g., voice calls, data transfers). For example, if the network is overloaded and D2D communication is being used by public safety users, then D2D communication can be prioritized, but access barring can be applied to the non-D2D traffic. In another example, if the D2D communication is being used for other purposes (e.g., photo sharing, video sharing), then UE-to-network traffic may be prioritized instead of device-to-device traffic.

If the UE receives the ACB configuration in the SIB2, and determines that access to the cell is barred for a specific RRC_Connection Establishment attempt, then the RRC layer of the UE can inform upper layers of the UE about the failure to establish the RRC connection due to access barring for D2D resource allocation being applied to the UE, upon which the RRC establishment procedure ends.

Alternative 1: ACB Skip Indicator for D2D

In one embodiment, instead of having separate barring parameters for D2D, the network can indicate to the UEs that the UEs can skip ACB for cases where the UEs are seeking to establish an RRC connection for the purpose of D2D communication. FIG. 1 illustrates an example of Abstract Syntax Notation One (ASN.1) code that can be used to define an information element (IE) 110 in a system information block type 2 (SIB2) that indicates whether ACB can be skipped by UEs that are requesting to establish an RRC connection for the purpose of D2D communication. UEs in the coverage area of the cell can then receive the IE in a SIB2 that is broadcasted by a node in a cell (e.g., by an eNB) and determine whether to apply ACB when seeking to establish an RRC connection for the purpose of D2D communication.

Alternative 2: ACB Skip Indicators for Specific D2D Categories/Types

In another embodiment, a mechanism can be defined so that the network can independently control access for the purpose of D2D for more than one category or type of UE. FIG. 2 illustrates an example of ASN.1 code that can be used to define two IEs in a SIB2. A first IE 210 indicates whether ACB can be skipped by public-safety UEs that are requesting to establish an RRC connection for the purpose of D2D communication. A second IE 220 indicates whether ACB can be skipped by commercial UEs that are requesting to establish an RRC connection for the purpose of D2D communication. By using these two IEs, an eNB can independently control access to the network for the purpose of D2D communication for more than one category of UE. This alternative is particularly suitable for cells whose eNB resources are split to support different D2D scenarios and, based on congestion conditions, different ACB functionalities.

While FIGS. 1 and 2 illustrate solutions wherein 1 and 2 IEs are added to the SIB2, respectively, larger numbers of IEs can also be added to the SIB2 in order to cover more categories/types of UEs or other specific purposes for D2D communication. In addition, alternatives 1 and 2 may be implemented together, if so desired.

Approach 1: Generic D2D Service Indication

FIG. 3 illustrates an example of a definition that may be added to a portion of the 3GPP Technical Specification (TS) 36.331 in order to modify the RRC connection establishment procedure in order to support ACB skip functionality for D2D communication. In this example, legacy RRC call types or establishment causes are used and remain unchanged. As shown in selection 310, a UE that is seeking to establish an RRC connection for D2D communication purposes can determine whether a SIB2 includes an IE (e.g., ac-BarringSkipForD2d) that indicates ACB can be skipped when a connection is sought for D2D communication purposes. If such an IE is present in the SIB2, the UE can consider access to the cell for D2D communication purposes to not be barred, as shown in selection 320.

Approach 2: Mobile Originated D2D (Call Type)

Figure 4A:
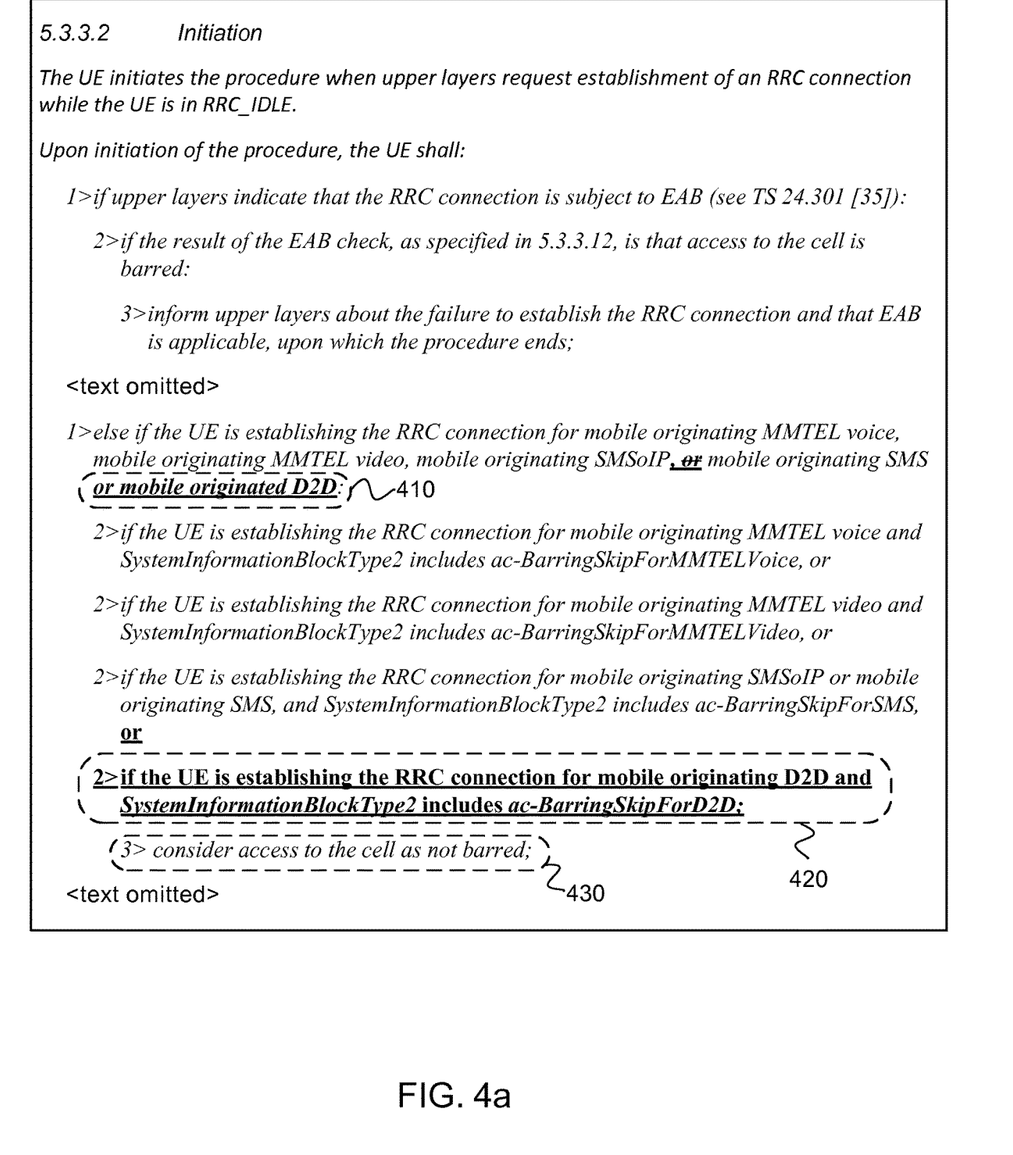
FIG. 4a illustrates another example of a definition that may be added to a portion of the 3GPP Technical Specification to support ACB skip functionality for D2D communication in accordance with an example.

FIG. 4a illustrates another example of a definition that may be added to a portion of 3GPP Technical Specification (TS) 36.331, such as version 12.0.x or later, in order to modify the RRC connection establishment procedure in order to support ACB-skip functionality for D2D communication. In this example, legacy RRC establishment causes remain unchanged, but a new call type, mobile originated D2D, is defined and shown in selection 410. The UE RRC layer can use this call type, which is received as a parameter from the UE NAS layer (when the RRC connection is requested by the NAS), to determine that an RRC connection is desired for D2D communication purposes. The UE can then determine whether a SIB2 received from the network includes an IE (e.g., ac-BarringSkipForD2d) that indicates ACB can be skipped when a connection is sought for D2D communication purposes, as shown in selection 420. If such an IE is present in the SIB2, the UE can consider access to the cell for D2D communication purposes to not be barred, as shown in selection 430.

Figure 4B:
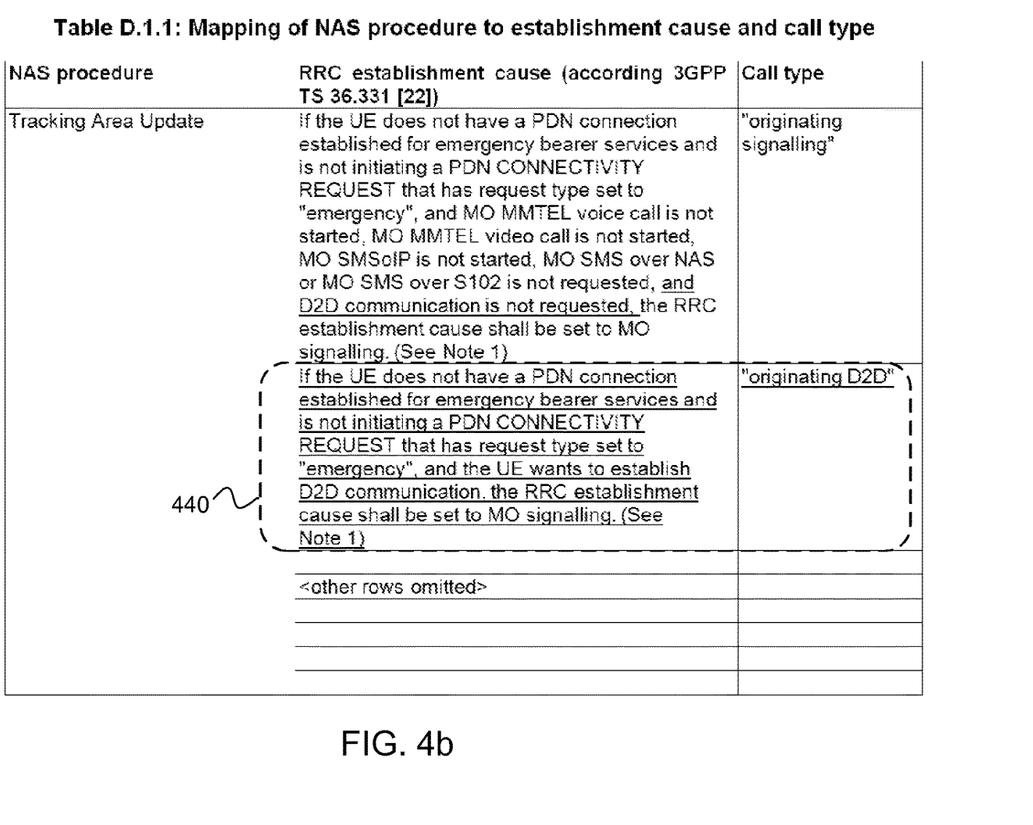
FIG. 4b illustrates an exemplary definition that may be added to a non-access stratum (NAS) specification in accordance with an example.

FIG. 4b illustrates an exemplary definition 440 that may be added to the non-access stratum (NAS) specification (e.g., in 3GPP TS 24.301, as shown) in accordance with approach 2.

Approach 3: RRC D2D Indication

In another example, a novel value for the RRC-establishment-cause parameter that is passed from the UE NAS layer to the UE RRC layer can be defined (such as 'D2D' or 'D2D communication,' for example). In this case, if the UE does not have a PDN connection established for emergency bearer services and is not initiating a PDN CONNECTIVITY REQUEST that has request type set to "emergency," and the UE wants to establish D2D communication, the RRC establishment cause can be set to "D2D communication." The UE can then be configured to determine that the purpose of a desired RRC connection sought to be established is D2D communication based on the establishment-cause parameter.

In another embodiment, a node in the network (e.g., an eNB) may also be configured to send a communication to UEs in the cell indicating whether UEs are permitted to "fall back" to using allocation mode 2 when using allocation mode 1 is barred.

In one example, the communication can comprise an information element (IE) (e.g., "fallBackToD2Dmode2 ENUMERATED {true}") included in a broadcast message from the network. The IE can be used to indicate that UEs are allowed to use mode 2 when mode 1 is barred. Alternatively, the IE can indicate that UEs are allowed to use mode 2 immediately without having to perform ACB for mode 1.

In another example, two different ACB parameters can be defined for each D2D resource allocation mode (e.g., "ac-BarringForD2D-Mode1" in the "AC-BarringConfig" object for mode 1 and "ac-BarringForD2D-Mode2" in the "AC-Barring Config" for mode 2). These ACB barring parameters could be used by the UE as follows. In one case, a UE seeking to establish an RRC connection for D2D communication may determine that that mode 1 is barred. The UE can then use the new ACB parameter broadcasted in "ac-BarringForD2D-Mode2 AC-Barring Config" to determine if D2D mode 2 is also barred. In another case, a UE seeking to establish an RRC connection for D2D communication may determine that neither mode 1 nor mode 2 is barred (i.e., the UE is permitted to use mode 1 or mode 2). In this case, the UE can choose a mode to use based on the ACB parameters for each mode. In another example, the presence of an "ac-BarringForD2D-Mode2" IE in a SIB2 can be used to indicate that UEs are allowed to fall back into mode 2 as long as any broadcasted ACB parameters are respected accordingly. The "ac-BarringForD2D-Mode2" parameter can be incorporated into the existing "AC-BarringConfig" object or can be in a different object containing other ACB-barring IEs.

While the foregoing mechanisms described herein are generally used for D2D communication, similar mechanisms could also be used for D2D discovery.

Figure 5:
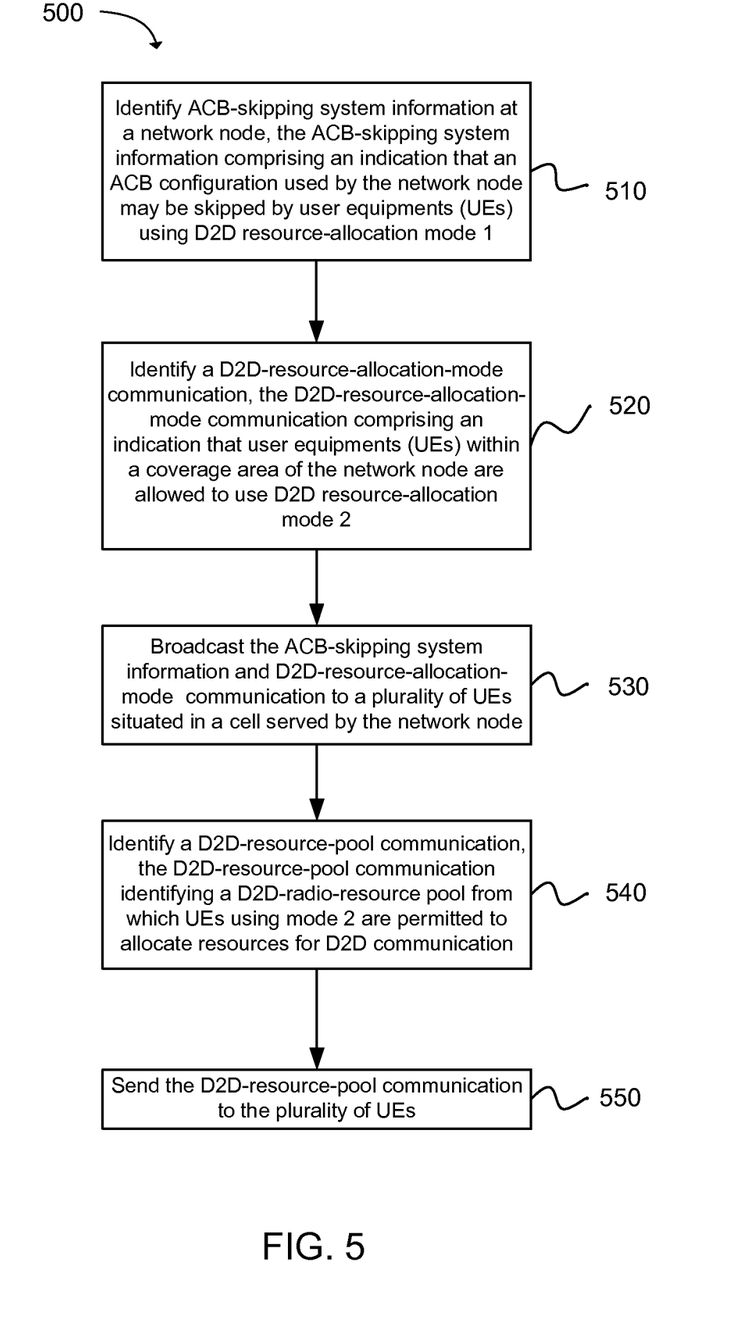
FIG. 5 is a flow diagram illustrating functionality of a network node in accordance with an example.

FIG. 5 is a flow diagram illustrating functionality 500 of a network node in accordance with an example. As in 510, ACB-skipping system information can be identified (e.g., by one or more processors) at a network node. The ACB-skipping system information can comprise an indication that an ACB configuration used by the network node may be skipped by user equipments (UEs) requesting to establish a radio resource control (RRC) connection for D2D communication using D2D resource-allocation mode 1. The ACB-skipping system information can comprise separate parameters for UEs of different categories (e.g., a public-safety category and/or a non-public-safety category). The ACB-skipping system information can also comprise an information element (IE) in a system information block type 2 (SIB2) broadcast. As in 520, a D2D-resource-allocation-mode communication can be also be identified (e.g., by one or more processors) at the network node). The D2D-resource-allocation-mode communication can comprise an indication that UEs within a cell served by the network node are allowed to use D2D-resource-allocation mode 2. As in 530, the network node can broadcast (e.g., via transceiver circuitry at the network node) the ACB-skipping system information and/or the D2D-resource-allocation-mode communication to a plurality of UEs situated in a cell served by the network node. As in 540, a D2D-radio-resource pool from which UEs using mode 2 are permitted to allocate resources for D2D communication can be identified (e.g., by one or more processors) at the network node. As in 540, a D2D-resource-pool communication can be identified (e.g., by one or more processors) at the network node. The D2D-resource-pool communication can identify a D2D-radio-resource pool from which UEs using mode 2 are permitted to allocate resources for D2D communication. As in 550, the network node can send (e.g., via transceiver circuitry at the network node) the D2D-resource-pool communication to the plurality of UEs.

Figure 6:
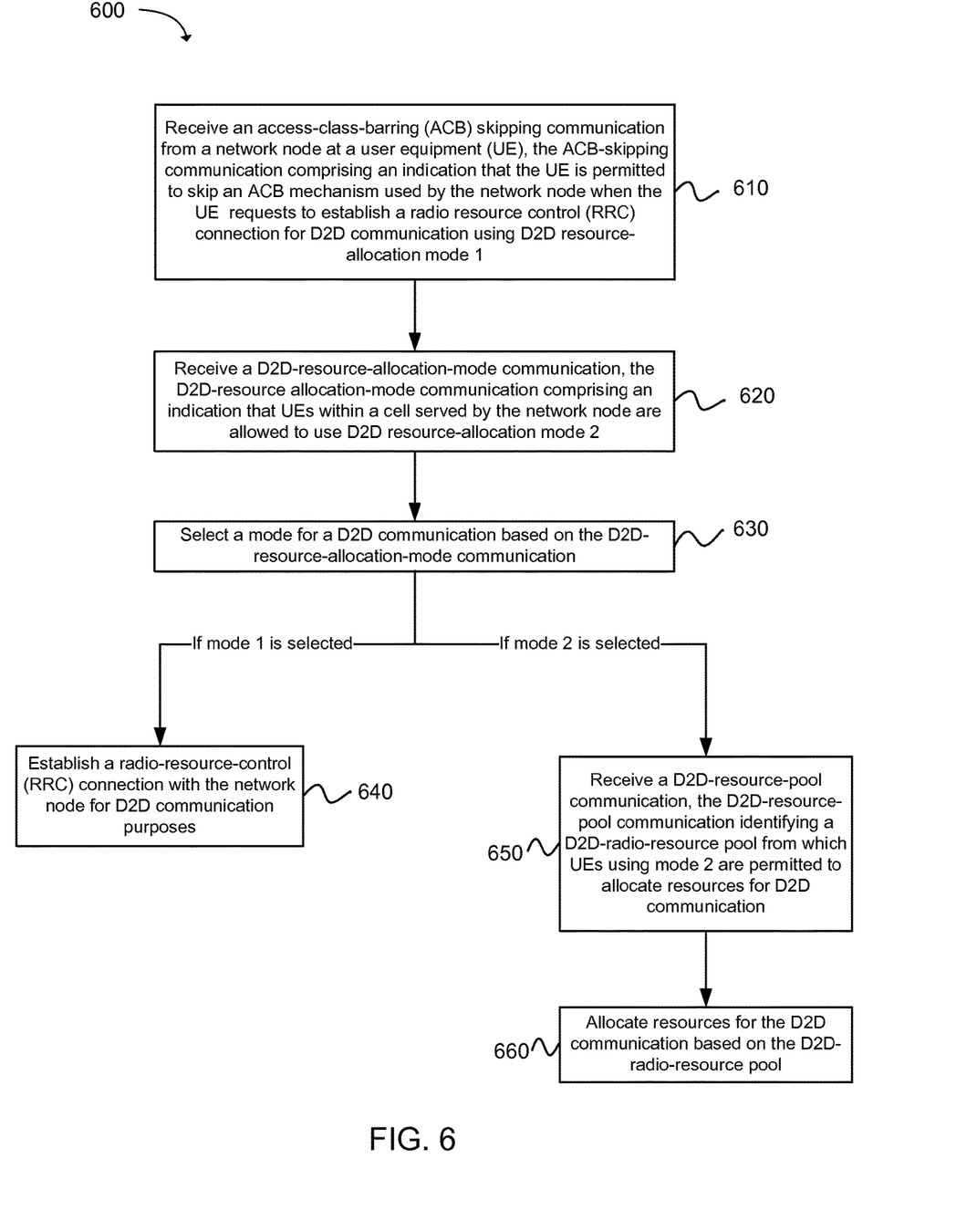
FIG. 6 is a flow diagram illustrating functionality of a UE in accordance with an example.

FIG. 6 is a flow diagram illustrating functionality 600 of a UE in accordance with an example. As in 610, the UE can receive (e.g., via transceiver circuitry at the UE) an ACB-skipping communication from a network node. The ACB-skipping communication can comprise an indication that the UE is permitted to skip an ACB mechanism used by the network node when the UE seeks to request to establish a radio resource control (RRC) connection for the purposes of D2D communication using a D2D resource-allocation mode 1. The ACB-skipping communication can comprise separate parameters for UEs of different categories (e.g., a public-safety category and/or a non-public-safety category). In addition, the ACB-skipping communication can comprise a first plurality of parameters applicable to mode 1, wherein each parameter corresponds to a different category of UEs (examples of categories: public safety, commercial, etc). The ACB-skipping communication can also comprise a second plurality of parameters applicable to a second mode 2, wherein each parameter corresponds to a different category of UEs. The ACB-skipping communication can also comprise an information element (IE) in a system information block type 2 (SIB2) broadcast. As in 620, the UE can receive (e.g., via transceiver circuitry at the UE) a D2D-resource-allocation-mode communication. The D2D-resource-allocation-mode communication can comprise an indication that UEs within a cell served by the network node are allowed to use D2D resource-allocation mode 2. In some embodiments, the UE can also receive (e.g., via transceiver circuitry at the UE) an ACB communication from the network node indicating that the UE is barred from using mode 1. As in 630, the UE can select (e.g., by using one or more processors at the UE) a mode for a D2D communication based on the D2D-resource-allocation-mode communication (and/or the ACB communication, if received). As in 640, if mode 1 is selected, the UE can establish (e.g., by using one or more processors at the UE) a radio-resource-control (RRC) connection with the network node (e.g., via transceiver circuitry at the UE) for D2D communication purposes. In some embodiments, the UE can comprise a radio-resource-control layer (RRC layer) module and a non-access-stratum-layer (NAS layer) module. The NAS-layer module can be configured to send a request to the RRC layer requesting that the RRC connection be established for D2D communication. The request can comprise a call type that signifies that the RRC connection is to be established for a mobile-originating D2D communication. Optionally, the RRC establishment cause can indicate D2D communication. As in 650, if mode 2 is selected, the UE can receive (e.g., via transceiver circuitry at the UE) a D2D-resource-pool communication. The D2D-resource-pool communication can identify a D2D-radio-resource pool from which UEs using mode 2 are permitted to allocate resources for D2D communication. As in 660, the UE can then allocate (e.g., by using one or more processors at the UE) resources for the D2D communication based on the D2D-radio-resource pool and based on the mode selected for the D2D communication.

Figure 7:
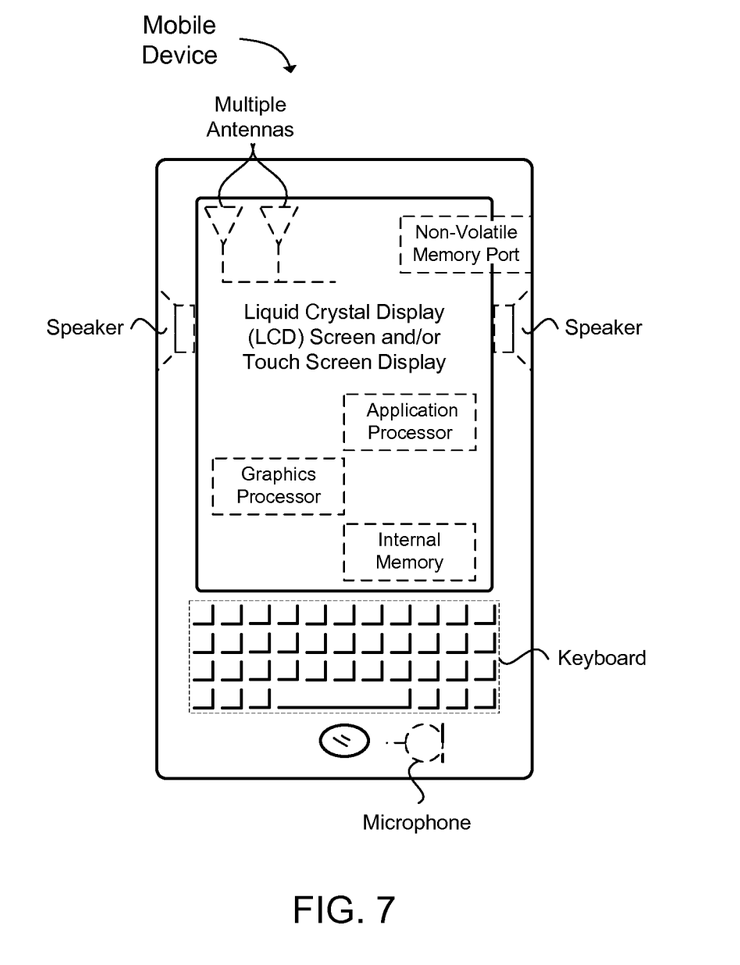
FIG. 7 illustrates a diagram of a wireless device (e.g., UE) in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications. The term "transceiver circuitry" can include one or more baseband processors for each transceiver or transceiver circuitry that are used to perform baseband processes including encoding, decoding, modulating, demodulating, and so forth.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous embodiments, examples, and alternatives.

Furthermore, the described features, structures, or characteristics can be combined in any suitable manner in one or more embodiments. In the following description, numerous specific details are provided, such as examples of layouts, distances, network examples, etc., to provide a thorough understanding of some embodiments. One skilled in the relevant art will recognize, however, that some embodiments may differ with respect to one or more of the specific details, or with other methods, components, layouts, etc. In other instances, well-known structures, materials, or operations are not shown or described in detail to avoid obscuring aspects of the embodiments.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts set forth in the disclosure and the claims. Accordingly, it is not intended that the disclosure or the drawings be limiting; the intended limitations are set forth by the claims below.

What is claimed is:

1. A network node operable to support device-to-device (D2D) communication and access class barring (ACB), the network node comprising:
   one or more processors configured to determine that an ACB configuration that is in effect in a cell served by the network node may be skipped by user equipments (UEs) in the cell for D2D communication; and
   transceiver circuitry configured to broadcast ACB-skipping system information to a plurality of UEs situated in the cell served by the network node, the ACB-skipping system information comprising an indication that the ACB configuration may be skipped by UEs in the cell requesting to establish D2D communication,
   wherein the ACB-skipping system information comprises separate parameters for UEs of different types, and the different types comprise at least one of a public-safety type or a non-public-safety type,
   wherein the one or more processors are further configured to determine that UEs in the cell served by the network node are allowed to use a second D2D resource-allocation mode (mode 2) when use of a first D2D resource allocation mode (mode 1) is barred in the cell, wherein the UEs allocate radio resources in mode 2 and the network node allocates radio resources in mode 1.

2. The network node of claim 1, wherein the ACB-skipping system information comprises an information element (IE) in a system information block type 2 (SIB2) broadcast.

3. The network node of claim 1, wherein:
   the transceiver circuitry is further configured to broadcast a D2D-resource-allocation-mode communication to the plurality of UEs situated in the cell served by the network node, the D2D-resource-allocation-mode communication comprising an indication that UEs are allowed to use mode 2 when use of mode 1 is barred in the cell.

4. The network node of claim 3, wherein the indication indicates that the ACB configuration may be skipped by UEs in the cell requesting to establish a radio-resource-control (RRC) connection for D2D communication.

5. A user equipment (UE) configured to support device-to-device (D2D) communication, the UE comprising:
   transceiver circuitry configured to receive an access-class-barring (ACB) skipping communication from a network node, the ACB-skipping communication comprising an indication that the UE is permitted to skip an ACB configuration used by the network node when the UE requests to establish a radio resource control (RRC) connection for D2D communication using a D2D resource-allocation mode (mode 1) wherein radio resources are allocated by the network node; and
   one or more processors configured to apply the indication when establishing the RRC connection for D2D communication to enable the UE to skip the ACB configuration,
   wherein the ACB-skipping communication comprises separate parameters for UEs of different types, and the different types comprise at least one of a public-safety type or a non-public-safety type,
   wherein the transceiver circuitry is further configured to receive a D2D-resource-allocation-mode communication, the D2D-resource allocation-mode communication comprising an indication that UEs within a cell served by the network node are allowed to use a second D2D resource-allocation mode (mode 2) when use of a first D2D resource allocation mode (mode 1) is barred in the cell, wherein the UEs allocate radio resources in mode 2 and the network node allocates radio resources in mode 1.

6. The UE of claim 5, wherein the ACB-skipping communication comprises an information element (IE) in a system information block type 2 (SIB2) broadcast.

7. The UE of claim 5, wherein the one or more processors are further configured establish a radio-resource-control (RRC) connection with the network node via the transceiver circuitry for D2D communication purposes based on the indication.

8. The UE of claim 5, wherein:
   the one or more processors are further configured to select a mode for a D2D communication based on the D2D-resource-allocation-mode communication.

9. The UE of claim 5, wherein the network node is an evolved Node B (eNB).

10. The UE of claim 5, wherein the ACB-skipping communication further comprises:
    a first plurality of parameters applicable to mode 1, wherein each parameter corresponds to a different category of UEs; and
    a second plurality of parameters applicable to a second D2D resource-allocation mode (mode 2), wherein each parameter corresponds to a different category of UEs, and wherein UEs are permitted to allocate radio resources for D2D communication when using mode 2.

11. The UE of claim 10, wherein:
    the transceiver circuitry is further configured to receive an ACB communication from the network node indicating that the UE is barred from using mode 1 for D2D communication; and the one or more processors are further configured to select mode 2 for D2D communication based on the ACB-skipping communication indicating that the UE is barred from using mode 1.

12. The UE of claim 5, further comprising:

a radio-resource-control layer (RRC layer) module; and a non-access-stratum-layer (NAS layer) module at the UE that is configured to send a request to the RRC layer module requesting that an RRC connection be established for D2D communication, the request comprising a call type or RRC establishment causes that signifies that the RRC connection is to be established for a mobile-originating D2D communication.

13. One or more non-transitory computer-readable mediums containing instructions thereon which when executed by one or more processors perform the following:

receiving, at a user equipment (UE), an access-class-barring (ACB) skipping communication from a network node, the ACB-skipping communication comprising an indication that the UE is permitted to skip an ACB configuration applied at the network node when the UE requests to establish a radio resource control (RRC) connection for D2D communication using a D2D resource-allocation mode (mode 1) wherein radio resources are allocated by the network node;

determining when a user equipment (UE) is allowed to establish a RRC connection for D2D communication using mode 1 based on the ACB-skipping communication, wherein the ACB-skipping communication includes a first plurality of parameters applicable to mode 1, wherein each parameter in the first plurality of parameters corresponds to a different category of UEs, and different categories of UEs include a public-safety category or a non-public-safety category; and receiving a D2D-resource-allocation-mode communication, the D2D-resource allocation-mode communication comprising an indication that UEs within a cell served by the network node are allowed to use a second D2D resource-allocation mode (mode 2) when use of a first D2D resource allocation mode (mode 1) is barred in the cell, wherein the UEs allocate radio resources in mode 2 and the network node allocates radio resources in mode 1.

14. The one or more non-transitory computer-readable mediums of claim 13, further comprising:

selecting a mode that will be used by the UE for a D2D communication based on the D2D-resource-allocation-mode communication.

15. The one or more non-transitory computer-readable mediums of claim 14, further comprising:

receiving a second plurality of parameters applicable to the second D2D resource-allocation mode (mode 2), wherein UEs are permitted to allocate radio resources for D2D communication when using mode 2; and selecting a mode that will be used by the UE for a D2D communication based on the first plurality of parameters and based on the second plurality of parameters.

* * * * *